US010357999B2

United States Patent
Daghini et al.

(10) Patent No.: US 10,357,999 B2
(45) Date of Patent: Jul. 23, 2019

(54) TYRE FOR MOTORCYCLES

(71) Applicant: PIRELLI TYRE S.P.A., Milan (IT)

(72) Inventors: Guido Luigi Daghini, Milan (IT); Stefano Tresoldi, Milan (IT); Mario Mariani, Milan (IT); Luca Miragliotta, Milan (IT); Fabrizio Cristofani, Valdarno (IT)

(73) Assignee: PIRELLI TYRE S.p.A., Milan (IT)

( * ) Notice: Subject to any disclaimer, the term of this patent is extended or adjusted under 35 U.S.C. 154(b) by 1091 days.

(21) Appl. No.: 14/369,068

(22) PCT Filed: Dec. 21, 2012

(86) PCT No.: PCT/IB2012/057587
§ 371 (c)(1),
(2) Date: Jun. 26, 2014

(87) PCT Pub. No.: WO2013/098735
PCT Pub. Date: Jul. 4, 2013

(65) Prior Publication Data
US 2014/0338810 A1    Nov. 20, 2014

Related U.S. Application Data

(60) Provisional application No. 61/581,990, filed on Dec. 30, 2011.

(30) Foreign Application Priority Data

Dec. 27, 2011    (IT) .................................. MI11A2395

(51) Int. Cl.
*B60C 9/22*     (2006.01)
*B60C 9/20*     (2006.01)
(Continued)

(52) U.S. Cl.
CPC .............. *B60C 9/0007* (2013.01); *B60C 9/18* (2013.01); *B60C 9/2204* (2013.01);
(Continued)

(58) Field of Classification Search
CPC . Y10T 152/10783; B60C 9/22; B60C 9/2204; B60C 9/0007;
(Continued)

(56) References Cited

U.S. PATENT DOCUMENTS 4,608,817 A * 9/1986 Brandyberry
4,690,191 A    9/1987 Kawasaki
(Continued)

FOREIGN PATENT DOCUMENTS

EP    0 143 651    6/1985
EP    0 461 646    12/1991
(Continued)

OTHER PUBLICATIONS

"Tire Cord", Kirk-Othmer Encyclopedia of Chemical Technology, Fourth Edition, vol. 24, John Wiley & Sons, 1997, pp. 169-170.*
(Continued)

*Primary Examiner* — Adrienne C. Johnstone
(74) *Attorney, Agent, or Firm* — Finnegan, Henderson, Farabow, Garrett & Dunner, L.L.P.

(57) ABSTRACT

Tyre for motorcycles includes a carcass structure, a belt structure arranged in a radially outer position with respect to the carcass structure and a tread band arranged in a radially outer position with respect to the belt structure, wherein the belt structure is of the zero degree type and includes at least one reinforcing cord having an elongation at break smaller than about 3%; the cord includes a plurality of first metal wires twisted together so as to form a core of first metal wires and a plurality of second metal wires twisted together around said core; and the number and the diameter of the
(Continued)

second metal wires are such that the second metal wires are not able to fully enclose the core.

14 Claims, 5 Drawing Sheets

(51) Int. Cl.
  *B60C 11/00* (2006.01)
  *B60C 9/00* (2006.01)
  *B60C 9/18* (2006.01)

(52) U.S. Cl.
  CPC .... *B60C 11/0083* (2013.01); *B60C 2009/228* (2013.01); *B60C 2009/2214* (2013.01); *B60C 2009/2257* (2013.01); *B60C 2009/2285* (2013.01); *B60C 2200/10* (2013.01); *Y10S 57/902* (2013.01); *Y10T 152/10783* (2015.01)

(58) Field of Classification Search
  CPC ......... B60C 2009/2209–2295; B60C 2200/10; B60C 11/0083; Y10S 57/902
  USPC ...... 152/531, 533, 527, 451, 209.14, 209.11, 152/530; 57/902
  See application file for complete search history.

(56) References Cited

U.S. PATENT DOCUMENTS

| | | | |
|---|---|---|---|
| 4,715,419 A | 12/1987 | Kawasaki et al. | |
| 5,427,164 A * | 6/1995 | Williams | 152/209.14 X |
| 5,473,878 A * | 12/1995 | Hamiel | 152/527 |
| 6,041,839 A | 3/2000 | Susutoglu | |
| 6,102,095 A * | 8/2000 | Obana | B60C 9/0007 152/451 |
| 6,442,922 B1 | 9/2002 | Han | |
| 7,404,425 B2 * | 7/2008 | Hardy | B60C 9/2204 152/531 X |
| 7,476,285 B2 * | 1/2009 | Ikehara | B60C 9/2204 152/531 X |
| 7,562,684 B2 * | 7/2009 | Nakagawa | B60C 9/0007 152/451 |
| 2002/0157754 A1 | 10/2002 | Falzolgher | |
| 2005/0121135 A1 | 6/2005 | Ikehara et al. | |
| 2009/0101266 A1 | 4/2009 | Barguet et al. | |
| 2012/0298276 A1 | 11/2012 | Barguet et al. | |

FOREIGN PATENT DOCUMENTS

| | | | |
|---|---|---|---|
| EP | 0 930 178 | | 7/1999 |
| EP | 1 067 236 | | 1/2001 |
| EP | 1 097 824 A2 | * | 5/2001 |
| EP | 1 213 159 | | 6/2002 |
| EP | 1 284 318 | | 2/2003 |
| EP | 2 127 903 | | 12/2009 |
| JP | 6-297905 | | 10/1994 |
| JP | 7 96710 | | 4/1995 |
| JP | 07096712 A | * | 4/1995 |
| JP | 2009023508 A | * | 2/2009 |
| JP | 5149953 | | 2/2013 |
| WO | WO-2010/041283 A1 | * | 4/2010 |

OTHER PUBLICATIONS

English machine translation of JP 7-96712 A, Apr. 11, 1995.*
English machine translation of JP 2009-23508 A, Feb. 5, 2009.*
English-language translation of Notification of the Second Office Action dated Nov. 2, 2016 by the State Intellectual Property Office of the People's Republic of China in corresponding Application No. CN 20128068695.4 (7 pages).
International Search Report from the European Patent Office for International Application No. PCT/IB2012/057587, dated Mar. 7, 2013.
Written Opinion of the International Searching Authority from the European Patent Office for International Application No. PCT/IB2012/057587, dated Mar. 7, 2013
Notification of the First Office Action from the State Intellectual Property Office of People's Republic of China in counterpart Chinese Application No. 201280067695.4, dated Jan. 14, 2016, 7 pages.

* cited by examiner

TYRE FOR MOTORCYCLES

CROSS REFERENCE TO RELATED APPLICATIONS

This application is a national phase application based on PCT/IB2012/057587, filed Dec. 21, 2012, and claims the priority of Italian Patent Application No. MI2011A002395, filed Dec. 27, 2011, and the benefit of U.S. Provisional Application No. 61/581,990, filed Dec. 30, 2011.

BACKGROUND OF THE INVENTION

Field of the Invention

The present invention relates to a tyre for motorcycles.

Description of the Related Art

The tyre of the present invention preferably is a tyre for wheels of high performance motorcycles, i.e. motorcycles capable of reaching speeds even higher than 270 km/h. Such motorcycles are those belonging to the category typically identified with the following classifications: hypersport, supersport, sport touring, and for lower speed indexes: scooter, road Enduro and custom.

The following definitions apply in the present description.

The terms "tyre for motorcycles" and/or "tyre for motorcycle wheels" are used to indicate tyres having a high curvature ratio (typically higher than 0.200), capable of achieving high camber angles during the cornering of the motorcycle.

"Camber angle" is used to indicate the angle between the equatorial plane of the tyre mounted on the motorcycle wheel and a plane orthogonal to the road surface.

"Equatorial plane" of the tyre is used to indicate a plane which is perpendicular to the rotation axis of the tyre and which splits the tyre into two symmetrically equal parts.

"Curvature ratio" of the tyre is used to indicate the ratio between the distance comprised between the radially higher point of the tread band and the maximum tyre chord, and the same maximum tyre chord, in a cross section thereof. The curvature ratio also identifies the so-called "transverse curvature" of the tyre.

The terms "radial" and "axial" and the expressions "radially inner/outer" and "axially inner/outer" are used with reference to the radial direction and to the axial direction of the tyre. The terms "circumferential" and "circumferentially", on the other hand, are used with reference to the direction of the annular development of the tyre, which corresponds to a direction lying on a plane parallel to the equatorial plane of the tyre.

The term "elastomeric material" is used to indicate a composition comprising at least one elastomeric polymer and at least one reinforcement filler. Preferably, such composition further comprises additives such as, for example, a cross-linking agent and/or a plasticizer. Thanks to the presence of the cross-linking agent, such material may be cross-linked by heating.

The expression "reinforcing cord" is used to indicate an element consisting of one or more elongated elements incorporated in a matrix of elastomeric material. Depending on the cases and to the specific applications, the above elongated elements are made of a textile or metal material.

The expression "elongation at break" of a reinforcing cord is used to indicate the percentage elongation at which break occurs, as determined by the BISFA E6 method (The International Bureau For The Standardization Of Man-Made Fibres, Internationally Agreed Methods For Testing Steel Tyre Cords, 1995 edition).

The expression "part load elongation" of a reinforcing cord is used to indicate the difference between the percentage elongation obtained by subjecting the cord to a tensile strength of 50 N and the percentage elongation obtained by subjecting the cord to a tensile strength of 2.5 N. The part load elongation is determined by the BISFA E6 method (The International Bureau For The Standardization Of Man-Made Fibres, Internationally Agreed Methods For Testing Steel Tyre Cords, 1995 edition).

The expression "reinforced strip-like element" is used to indicate an elongated composite having a cross-sectional profile with a flat shape and comprising one or more reinforcing cords extended parallel to the longitudinal development of the product and incorporated in, or at least partly coated by, at least one layer of elastomeric material. Such reinforced strip-like element is also commonly called "band-like element".

Tyres for motorcycle wheels have a high transverse curvature so as to provide an adequate contact surface with the road surface when the motorcycle is inclined to turn a bend.

In addition to bearing the motorcycle weight in all the running conditions (thus including the weight of the driver, any passengers and any loads), such tyres should ensure driving stability, controllability, directionality, comfort, road-holding, besides high mileage and regular wear.

High performance tyres, which are suitable for being mounted on large piston displacement (e.g. 1000 $cm^3$ or higher) and/or high power (e.g. 170-180 HP or higher) motorcycles, should provide an excellent adhesion to the road, so as to effectively discharge the high driving torque to the ground both when driving on straight roads and during accelerations when exiting a bend, as well as ensure an adequate response to the side forces on bends and an effective braking force.

The behaviour of tyres for motorcycles, especially on bends and in particular in the case of tyres for high performance motorcycles, highly depends on the particular type and shape of the belt structure. In fact, the belt structure is configured to transfer to the carcass structure the side and longitudinal stresses the tyre is subjected to because of the contact with the road surface, thus contributing to imparting the desired features of structural resistance, performance (i.e. adhesion, driving stability, controllability, directionality, road-holding) and comfort to the tyre.

The particular type and shape of the belt structure has a considerable impact on the weight and/or production cost of the tyre.

The use of belt structures of the so-called "crossed" type and belt structures of the so-called "zero degree" type is widespread in tyres for motorcycles.

Belt structures of the "crossed" type typically have two belt layers arranged radially one on top of the other. Each belt layer comprises a plurality of reinforcing cords arranged parallel to each other and made of a textile or metal material, more typically textile in tyres for motorcycles. The belt layers are reciprocally arranged so that the reinforcing cords of the first belt layer are tilted with respect to the equatorial plane of the tyre, whereas the reinforcing cords of the second layer are also tilted, but they are oriented on the opposite side with respect to the reinforcing cords of the first layer with reference to the equatorial plane of the tyre.

Belt structures of the "zero degree" type typically comprise a plurality of reinforcing cords made of a textile or metal material. Such reinforcing cords are wound on the carcass structure according to coils arranged next to one another in the axial direction and oriented substantially parallel to the equatorial plane of the tyre or tilted with respect to said equatorial plane by a very small angle.

EP 0 461 646 describes a tyre for motorcycles comprising a belt structure of the zero degree type formed starting from a plurality of high elongation reinforcing cords (also called "HE cords"). Each reinforcing cord comprises a plurality of strands twisted together, each strand in turn comprising a plurality of metal wires twisted together.

EP 2 127 903 describes a tyre for motorcycles comprising a belt structure of the zero degree type formed starting from a steel-rubber composite material obtained by incorporating into the rubber multiple steel elements individually shaped as a spiral, without the above steel elements being wound spiral-wise with each other.

EP 1 284 318 describes a tyre for motorcycles comprising a belt structure of the zero degree type formed starting from a plurality of metal wires having an elongation at break comprised between 3% and 7% and a breaking load not lower than 2700 N/mm².

EP 1 213 159 describes a tyre for motorcycles comprising a belt structure of the zero degree type formed starting from reinforcing cords comprising each a plurality of metal wires twisted together leaving a central gap between said metal wires extending by the entire wire length, such gap being occupied by the elastomeric material mixture after the vulcanization. The metal wires of each cord are from two to seven. The reinforcing cords have an elongation at break comprised between 3% and 6%.

SUMMARY OF THE INVENTION

The Applicant has been long manufacturing tyres for motorcycles with belt structure of the zero degree type, comprising high elongation metal cords (HE cords). Such tyres have excellent features of structural resistance, performance (in terms of adhesion, driving stability, controllability, directionality, road-holding) and comfort and are highly appreciated by customers.

However, the Applicant has found that if on the one hand the use of high elongation metal cords allows the above requirements to be met, on the other hand it implies a complex and expensive construction of the cord which, among the other things, requires a sturdy rubber coating which affects the weight of the tyre, which is unavoidably increased thereby.

The Applicant has therefore considered the problem of manufacturing a belt structure of the zero degree type for tyres of motorcycles, using metal cords which are easier to manufacture and having a weight and number of metal wires as small as possible but without impairing the desired features of structural resistance, performance (in terms of adhesion, driving stability, controllability, directionality, road-holding) and comfort of the tyre.

The Applicant has found that such problem may be solved using cords having a small elongation at break and made starting from a plurality of first metal wires twisted together so as to obtain a core of first metal wires and a plurality of second metal wires twisted about said core of first metal wires, wherein the number of the second metal wires is such that the second metal wires are not able to fully enclose the core of first, metal wires.

In the present description and following claims, the above expression "does not fully enclose", used for defining the positioning of the plurality of second metal wires with respect to the core of first metal wires, is used to indicate an arrangement of the second metal wires with respect to the core of first metal wires such that, in any cross section of the cord, the second metal wires are positioned at only an angular portion of an ideal circumference that circumscribes the core of first metal wires and/or are distributed along said entire ideal circumference in an irregular manner, or in a regular manner but without being all in contact with each other.

Surprisingly, the Applicant has found that a belt structure of the zero degree type comprising such metal cords allows obtaining the desired features of structural resistance, performance, comfort and the desired reduction of manufacturing costs/time of the tyre, although such cords have a small elongation at break and a part load elongation significantly smaller than that of the high elongation reinforcing cords described in EP 0 461 646.

The Applicant believed that, by virtue of the part load behaviour, the use of cords of the type described above could have led to process problems related to the need of using a green tyre having a diameter substantially equal to that of the vulcanized tyre, with consequent difficulty of introduction of the green tyre into the mould. Moreover, the Applicant believed that, by virtue of the reduced part load elongation, the reinforcing cords described above could have imparted an excessive stiffness to the tyre, to the detriment of comfort, conformability and, more in general, of the impact energy absorption of the same tyre.

The Applicant has surprisingly found that the abovementioned process problems do not actually occur and, even more surprisingly, that excellent results are achieved in terms of conformability and comfort of the tyre.

Without being bound to any interpretation theory, according to the Applicant the unexpected results in terms of comfort and conformability of the tyre may be ascribed to the particular arrangement of the metal wires which allows, after the vulcanization, an excellent penetration of the elastomeric material therebetween, so that such metal wires, when subjected to deformation due to the longitudinal and lateral stresses that occur because of the wheel-road contact while running, cooperate with the elastomeric material surrounding them, dissipating the above stresses thereon. A composite of two materials (metal and elastomeric material) is ultimately created wherein both materials concur to suitably transfer and dampen the stresses generated while running, to the advantage of comfort and conformability.

Advantageously, moreover, the presence of elastomeric material between the metal wires allows the risk of propagation of air and water to be prevented or significantly reduced in case of piercing or repair, with consequent elimination or considerable reduction of the risk of corrosion or spreading of rust into the belt structure. An advantageous extension of the tyre life cycle and a reduction of the risks of aging of the cord are thus obtained.

The Applicant has further found that a cord as the one described above may be made in a single twisting step of all metal wires and with a reduced number of metal wires. Therefore, it is easy to be manufactured, with consequent reduction of the manufacturing time/cost of the cord and tyre, in addition to the weight reduction.

Ultimately, the Applicant has found that using reinforcing cords as described above in the belt allows tyres for motorcycles to be obtained which have optimal features in terms of structural resistance, performance, comfort, conformability, weight/manufacturing cost and life cycle duration.

In an aspect thereof, the present invention relates to a tyre for motorcycle wheels comprising:
 a carcass structure;
 a belt structure arranged in a radially outer position with respect to the carcass structure;

a tread band arranged in a radially outer position with respect to the belt structure;

wherein said belt structure comprises at least one reinforcing cord wound on said carcass structure according to adjacent coils oriented along a substantially circumferential direction;

wherein said at least one reinforcing cord has an elongation at break smaller than about 3% and comprises:

a plurality of first metal wires twisted so as to form a core of first metal wires, and a plurality of second metal wires twisted together around said core of first metal wires;

wherein the number and the diameter of said second metal wires are such that said second metal wires are not able to fully enclose said core of first metal wires.

The present invention can comprise at least one of the following preferred features.

Preferably, said at least one reinforcing cord comprises a number of metal wires comprised between five and ten.

For example, said at least one reinforcing cord may comprise a number of metal wires equal to eight.

Preferably, said at least one cord comprises a number of first metal wires different from the number of second metal wires.

Preferably, said core of first metal wires comprises two or three first metal wires.

Preferably, said at least one reinforcing cord comprises a number of second metal wires comprised between three and seven.

For example, said at least one reinforcing cord comprises a number of second metal wires equal to five.

Preferably, said first metal wires are twisted with a first twisting pitch greater than about 5 mm, more preferably greater than about 7 mm.

Preferably, said first metal wires are twisted with a first twisting pitch smaller than about 16 mm, more preferably smaller than about 13 mm.

In preferred embodiments of the present invention, said first metal wires are twisted with a first twisting pitch comprised between about 5 mm and about 16 mm, more preferably between about 7 mm and about 13 mm.

Preferably, said second metal wires are twisted with a second twisting pitch greater than about 5 mm, more preferably greater than about 7 mm.

Preferably, said second metal wires are twisted with a second twisting pitch smaller than about 16 mm, more preferably smaller than about 13 mm.

In preferred embodiments of the present invention, said second metal wires are twisted with a second twisting pitch comprised between about 5 mm and about 16 mm, more preferably between about 7 mm and about 13 mm.

In particularly preferred embodiments of the present invention, said first twisting pitch is substantially equal to said second twisting pitch.

For example, said first and/or said second twisting pitch is equal to about 10 mm.

Preferably, said at least one reinforcing cord has a diameter greater than about 0.4 mm, more preferably greater than about 0.6 mm.

Preferably, said at least one reinforcing cord has a diameter smaller than about 1.4 mm, more preferably smaller than about 1 mm.

In preferred embodiments of the present invention, said at least one cord has a diameter comprised between about 0.4 mm and about 1.4 mm, more preferably between about 0.6 mm and about 1 mm.

For example, said at least one reinforcing cord has a diameter equal to about 0.75 mm.

Preferably, said first metal wires have a diameter greater than about 0.08 mm, more preferably greater than about 0.12 mm.

Preferably, said first metal wires have a diameter smaller than about 0.35 mm, more preferably smaller than about 0.25 mm.

In preferred embodiments of the present invention, said first metal wires have a diameter comprised between about 0.08 mm and about 0.35 mm, more preferably between about 0.12 mm and about 0.25 mm.

Preferably, said second metal wires have a diameter greater than about 0.08 mm, more preferably greater than about 0.12 mm.

Preferably, said second metal wires have a diameter smaller than about 0.35 mm, more preferably smaller than about 0.25 mm.

In preferred embodiments of the present invention, said second metal wires have a diameter comprised between about 0.08 mm and about 0.35 mm, more preferably between about 0.12 mm and about 0.25 mm.

In the preferred embodiments of the present invention, said first and second metal wires have a substantially equal diameter.

For example, said diameter may be equal to about 0.20 mm.

In preferred embodiments of the present invention, said first and second metal wires are made of the same material.

Preferably, said material is steel, more preferably NT (Normal Tensile), HT (High Tensile), SHT (Super High Tensile) or UHT (Ultra High Tensile) steel. Typically, such steel has a carbon content smaller than about 1%.

Preferably, the carbon content is greater than or equal to about 0.7%. Typically, the steel has a tensile strength greater than about 2600 MPa. Typically, such tensile strength is smaller than about 4500 MPa.

Preferably, the first and second metal wires are coated with brass or other corrosion-resistant coating (for example Zn/Mn).

The twisting of said first metal wires for forming said core of first metal wires is preferably carried out at the same time as the twisting of said second metal wires about said core of first metal wires.

BRIEF DESCRIPTION OF THE DRAWINGS

Further features and advantages of the tyre of the present invention will appear more clearly from the following detailed description of preferred embodiments thereof, made with reference to the attached drawings. In such drawings.

DETAILED DESCRIPTION OF THE INVENTION

Figure 1:
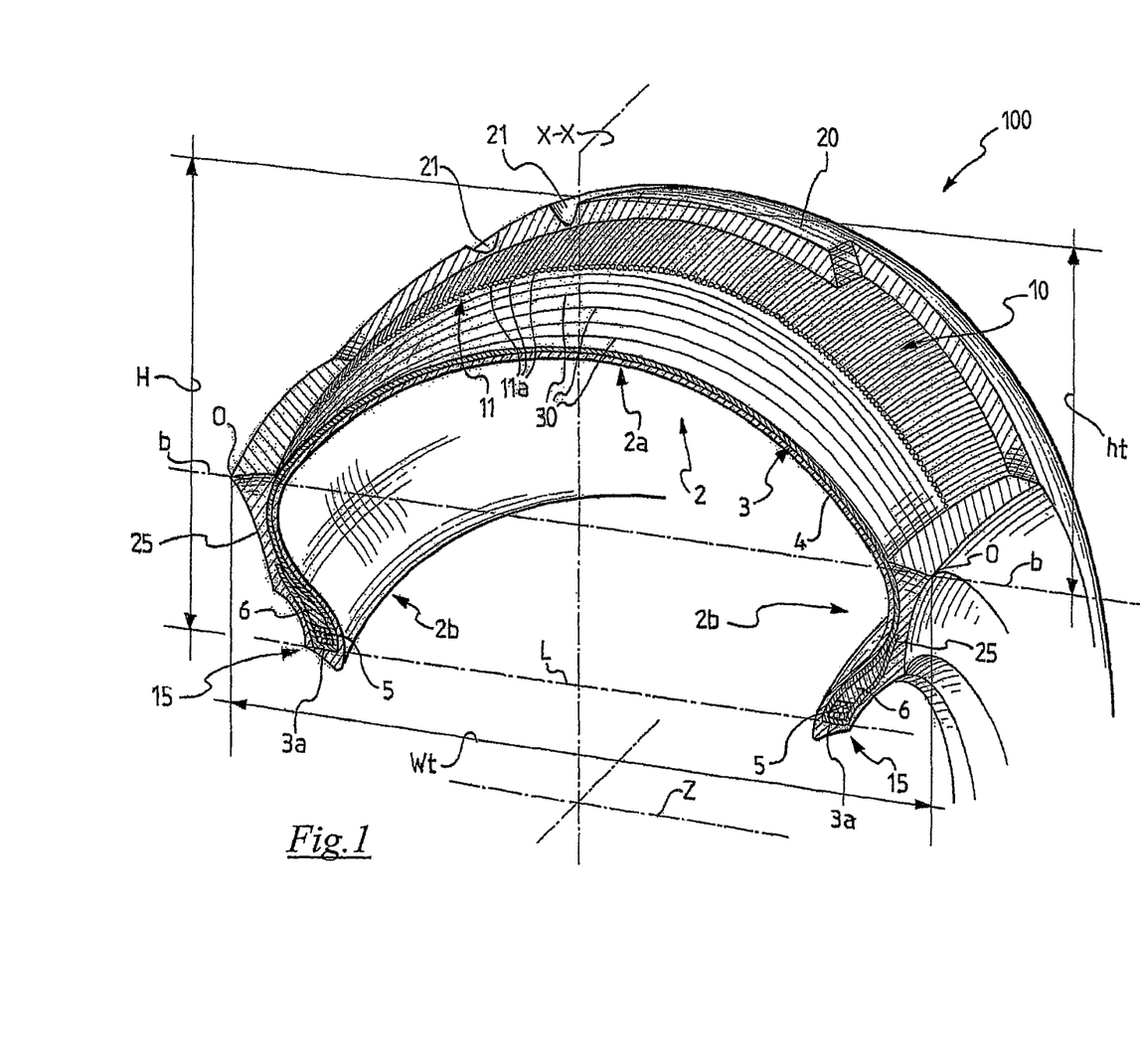
FIG. 1 is a perspective partly cutaway view of a portion of a tyre according to the present invention.

In FIG. 1, reference numeral 100 is used to globally indicate a tyre for motorcycles according to the present invention. In particular, the tyre 100 is intended to be used preferably on a front or rear wheel of a large piston-displacement (e.g. 1000 cm$^3$ or higher) and/or high power (e.g. 170-180 HP or higher) motorcycle.

In the tyre 100 an equatorial plane X-X and an axis of rotation Z perpendicular to the equatorial plane X-X are defined. Moreover, an axial (or transverse, or side) direction parallel to the axis of rotation Z and a circumferential (or longitudinal) direction parallel to the equatorial plane X-X and corresponding to the rolling direction of tyre 100 are defined.

Tyre 100 comprises a carcass structure 2 comprising at least one carcass ply and having, in an axial section thereof, a substantially toroidal shape.

The carcass structure 2 comprises a crown portion 2a symmetrically arranged with respect to the equatorial plane X-X and opposite side portions 2b arranged on axially opposite sides with respect to the rim portion 2a.

The carcass structure 2 herein shown comprises a carcass ply 3 extending axially from a side portion 2b of the carcass structure 2 to the opposite side portion 2b.

The carcass ply 3 is preferably coated, on the radially inner wall, with a sealing layer 4, or so-called "liner", essentially consisting of a layer of airtight elastomeric material adapted to ensure the seal of the tyre 100 once inflated.

The carcass ply 3 is engaged, at the respective axially opposite side edges 3a, with respective annular reinforcing structures 5, typically called "bead cores".

Each side edge 3a of the carcass ply 3 is turned around a respective bead core 5.

A tapered elastomeric filler 6 is applied on the outer perimeter edge of the bead cores 5. The filler 6 occupies the space defined between the carcass ply 3 and the respective turned side edge 3a.

In an alternative embodiment which is not shown, the carcass ply has its opposite side edges associated, without being turned thereon, with particular annular reinforcing structures provided with two metal annular inserts. In this case, a filler of elastomeric material may be arranged in an axially outer position with respect to the first annular insert. The second annular insert is arranged in an axially outer position with respect to the carcass ply end. Finally, a further filler, which completes the manufacturing of the annular reinforcing structure, may be provided in an axially outer position with respect to said second annular insert and not necessarily in contact therewith.

The zone of the tyre comprising the bead core 5 and the elastomeric filler 6 forms the so-called "bead", which is globally indicated in FIG. 1 with reference numeral 15. The bead 15 is configured to allow anchoring of the tyre on a corresponding mounting rim, not shown, by means of an elastically forced fitting.

A belt structure 10, which is described hereinafter in more detail, is provided in a radially outer position with respect to said carcass structure 2, at at least one axial portion of the crown portion 2a.

A tread band 20 is applied in a radially outer position with respect to the belt structure 10. Through the tread band 20 the tyre 100 contacts the road surface.

The tread band 20 typically has a tread pattern defined by a plurality of grooves 21 which are variously located in the different zones of the tyre. For clarity of illustration, only some of the grooves 21 of tyre 100 are shown and/or visible in FIG. 1.

At each of the opposite side portions 2b of the carcass structure 2 tyre 100 may further comprise a respective sidewall 25 which extends from the tread band 20 to the bead 15 of tyre 100.

Tyre 100 of the present invention is characterised by a high transverse curvature (and thus by a high curvature ratio) and preferably lowered sidewalls.

With reference to FIG. 1, the curvature ratio of tyre 100 is defined by the value of the ratio between distance ht of the ridge of the tread band 20 from line b-b passing by the ends of the tread band 20, measured on the equatorial plane X-X, and distance wt between said ends of the tread band 20. If the ends of the tread band cannot be easily identified, for example due to the lack of a precise reference such as for example the edge indicated in FIG. 1 with O, the measure of the maximum tyre chord may certainly be assumed as distance wt.

Preferably, the curvature ratio is greater than or equal to 0.2, more preferably greater than or equal to 0.25. If tyre 100 is intended to be mounted on a front wheel, the curvature ratio may also be greater than 0.30. Such curvature ratio is typically smaller than or equal to 0.8, more preferably smaller than or equal to 0.5.

Tyre 100 of the present invention preferably is a tyre with particularly low sidewalls.

With reference to FIG. 1, by tyre with low or lowered sidewalls it is meant in the present description a tyre wherein the ratio between distance H-ht and height H, measured on the equatorial plane X-X between the radially highest point of the tread band 20 and the fitting diameter, substantially identified by the reference line L passing by the beads 15 of the tyre, is preferably smaller than 0.6, more preferably smaller than 0.5.

The carcass ply 3 of the carcass structure 2 is preferably made of an elastomeric material and comprises a plurality of reinforcing elements 30. For clarity of illustration, reference numeral 30 in FIG. 1 is associated to only some of the reinforcing elements described.

The reinforcing elements 30 preferably comprise textile cords selected among those usually adopted in the manufacturing of tyre carcasses, for example among nylon, rayon, PET, PEN, Lyocell, aramid.

The reinforcing elements 30 are preferably arranged in a substantially radial direction, i.e. according to an angle (measured at the top of tyre 100) comprised between 65° and 110°, more preferably between 80° and 100°, with respect to the equatorial plane X-X.

The belt structure 10 is of the zero degree type. It is formed by winding on the crown portion 2a of the carcass structure 2 a single reinforcing cord 11 or a reinforced strip-like element of rubber fabric comprising a plurality of cords 11 arranged side by side in the axial direction, to form a plurality of coils 11a substantially oriented according to the circumferential direction of tyre 100 (typically with an angle comprised between 0° and 5° with respect to the equatorial plane X-X). If a reinforced strip-like element is used, it may comprise up to five cords 11, more preferably two or three or four cords 11.

For clarity of illustration, reference numeral 11a in FIG. 1 is associated to only some of the coils shown.

Preferably, the winding defined by the coils 11a axially extends on the whole crown portion 2a with a winding pitch which may be constant or variable in the axial direction.

The belt structure 10 may also comprise one or more support layers of elastomeric material (not shown) interposed between the layer of cords 11 and the carcass ply 3 and whereon coils 11a are wound. Such layer(s) may extend on a surface having an axial extension substantially corresponding to the surface whereon coils 11a develop.

In a preferred embodiment of tyre 100 of the present invention, a support layer is used which comprises short aramidic fibres, for example made of Kevlar®, dispersed into an elastomeric material.

In a further embodiment which is not shown, in the tyre 100 may be used, in addition or in alternative to the support layer described above, at least one layer reinforced with textile cords (fully similar to the cords usable in the carcass structure 2) which are oriented substantially radially (for example with an angle between 65° and 110° with respect to the equatorial plane X-X of the tyre). Such layer axially extends at least on the crown portion 2a of the carcass structure 2, or even on a larger portion, but without being turned around the bead cores 5.

In a preferred embodiment of tyre 100 of the present invention, an additional layer (not shown) of elastomeric material is arranged between the belt structure 10 and the tread band 20. Preferably, such additional layer axially extends on the crown portion 2a of the carcass structure 2.

As an alternative, the above additional layer may axially extend on a surface smaller than the axial development surface of the belt structure 10, for example only on axially opposite side portions of the belt structure 10.

Figure 2:
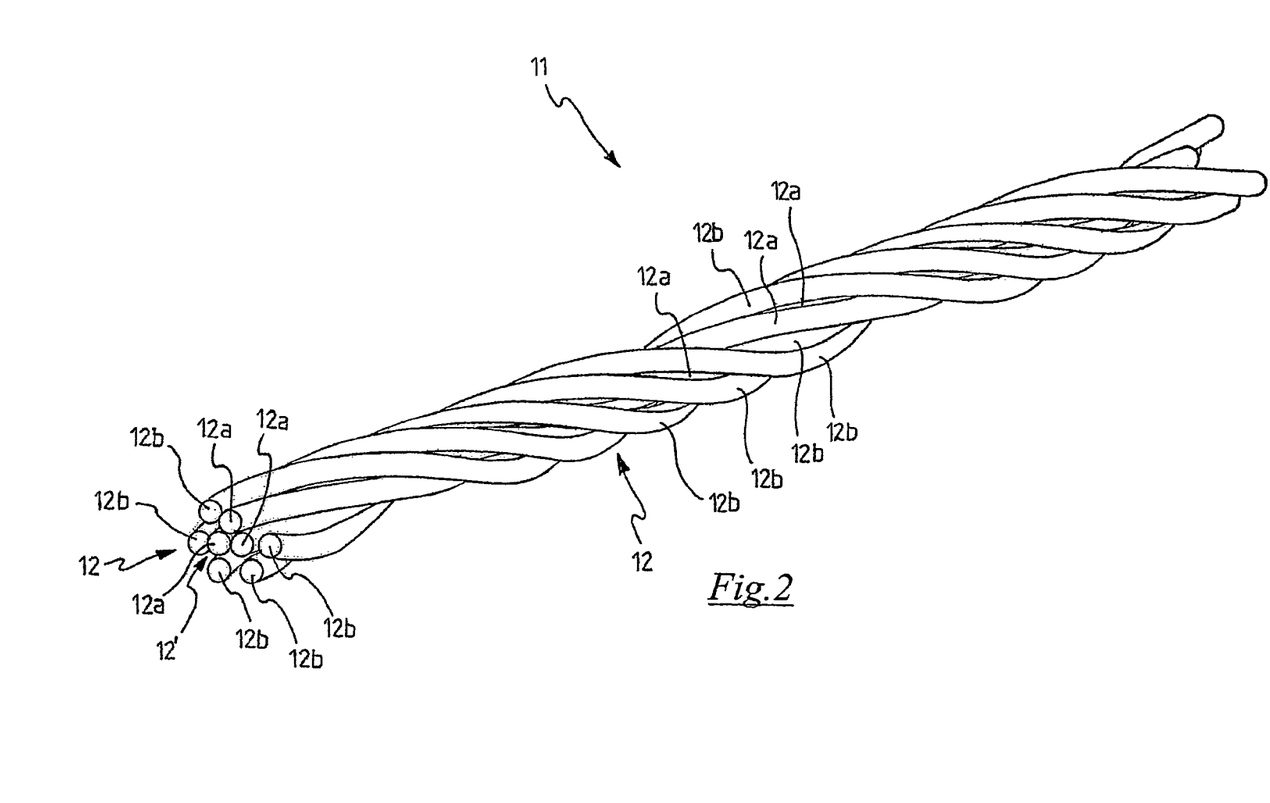
FIG. 2 is a perspective view of a reinforcing cord used in the tyre of FIG. 1.

As shown in figures in FIG. 2, cord 11 used in the belt structure 10 of the zero degree type of tyre 100 of the present invention comprises a plurality of metal wires 12 which are all preferably made of the same material. In a preferred embodiment of the present invention, such material is NT (Normal Tensile), HT (High Tensile), SHT (Super High Tensile) or UHT (Ultra High Tensile) steel. Typically, such steel has a carbon content smaller than about 1%. Preferably, the carbon content is greater than or equal to about 0.7%. Typically, the steel has a tensile strength greater than about 2600 MPa. Typically, such tensile strength is smaller than about 4500 MPa.

Preferably, the metal wires 12 are coated with brass or other corrosion-resistant coating (for example Zn/Mn).

In some embodiments, at least one of the metal wires 12 may be pre-deformed (for example sinusoidally, polygonally, helically pre-deformed, etc.).

Preferably, cord 11 has a diameter comprised between about 0.4 mm and about 1.4 mm, more preferably between about 0.6 mm and about 1.0 mm, for example equal to about 0.75 mm.

Preferably, the metal wires 12 are from five to ten, more preferably eight.

Some of the above metal wires 12 (indicated with reference numeral 12a in FIGS. 2 and 3) are twisted together with a predetermined twisting pitch so as to form a core 12' of metal wires. Such core 12' may comprise, in particular, two or three metal wires 12a, three in the embodiment shown herein.

Figure 3:
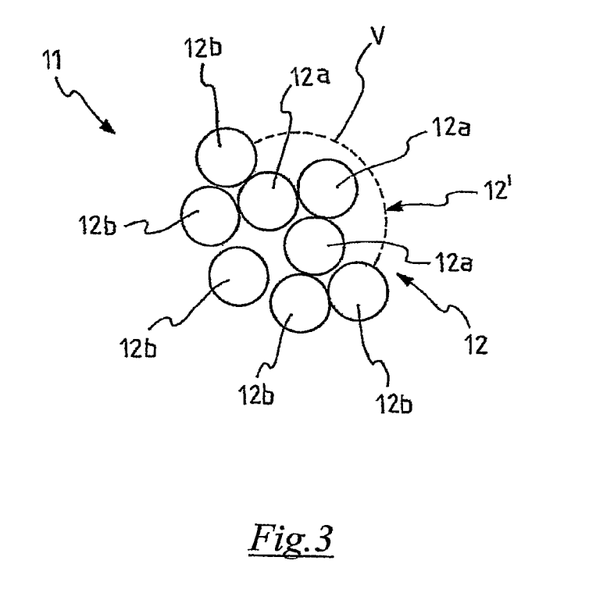
FIG. 3 is an enlarged view of a cross section of the reinforcing cord of FIG. 2.

Preferably, said twisting pitch is comprised between about 5 mm and about 16 mm, more preferably between about 7 mm and about 13 mm, for example it is equal to about 10 mm.

The other metal wires 12 (indicated with reference numeral 12b in FIGS. 2 and 3) are twisted about core 12' with a twisting pitch which is preferably equal to that of the first metal wires 12a.

The twisting pitch of the metal wires 12b may also be different from that of the first metal wires 12a. In any case, it is comprised between about 5 mm and about 16 mm and preferably between about 7 mm and about 13 mm.

Preferably, the twisting of the metal wires 12a for forming the core 12' takes place at the same time as the twisting of the metal wires 12b about core 12'. This implies an advantageous reduction of the manufacturing time of cord 11.

As well shown in FIG. 3, the number and the diameter of the metal wires 12b are selected so that the metal wires 12b do not fully enclose core 12'.

To highlight this aspect, FIG. 3 shows a dashed line V that indicates the portion of cord 11 wherein core 12' is not covered or enclosed by the metal wires 12b.

The provision of a portion of cord 11 wherein the metal wires 12b do not cover/enclose core 12' allows the elastomeric material to penetrate, due to the vulcanization, into the interspaces defined both between the various metal wires 12b and between the metal wires 12b and core 12', and between the metal wires 12a of core 12'. According to the Applicant, a composite of metal wires 12 and elastomeric material is thus created which effectively works in response to the longitudinal and lateral stresses occurring because of the wheel-road contact, to the advantage of comfort and conformability of tyre 100 of the present invention. Moreover, since the elastomeric material which is between the metal wires 12 prevents or greatly reduces the risk of propagation of air and water into the belt structure 10 in case of piercing or repair, it contributes to the extension of the life cycle of tyre 100 of the present invention and to the reduction of the aging risks of cord 11.

Preferably, as shown in FIG. 3, the metal wires 12b are distributed about the core 12' in an irregular manner, i.e. so as to define an irregular shape, i.e. a shape not circumscribed by an ideal circumference. Such irregular shape can be found in any cross section of cord 11 and is oriented in a different manner in the various cross sections of cord 11 taken at longitudinally different positions.

The metal wires 12b are preferably in a number comprised between three and seven, five in the embodiment shown herein.

FIGS. 2 and 3 therefore show a cord 11 having a construction identifiable as 3+5.

The metal wires 12a and the metal wires 12b may have the same diameter or different diameters.

Preferably, if the diameters are different, the metal wires 12a have a diameter greater than that of the metal wires 12b.

In the embodiment shown herein, the metal wires 12a and the metal wires 12b have the same diameter. Such diameter is preferably comprised between about 0.08 mm and about 0.35 mm, more preferably between about 0.12 mm and about 0.25 mm, for example equal to about 0.20 mm.

Cord 11 used in the belt structure 10 of the zero degree type of tyre 100 of the present invention has an elongation at break smaller than 3%, preferably smaller than 2.75%, even more preferably smaller than 2.50%.

Figure 4:
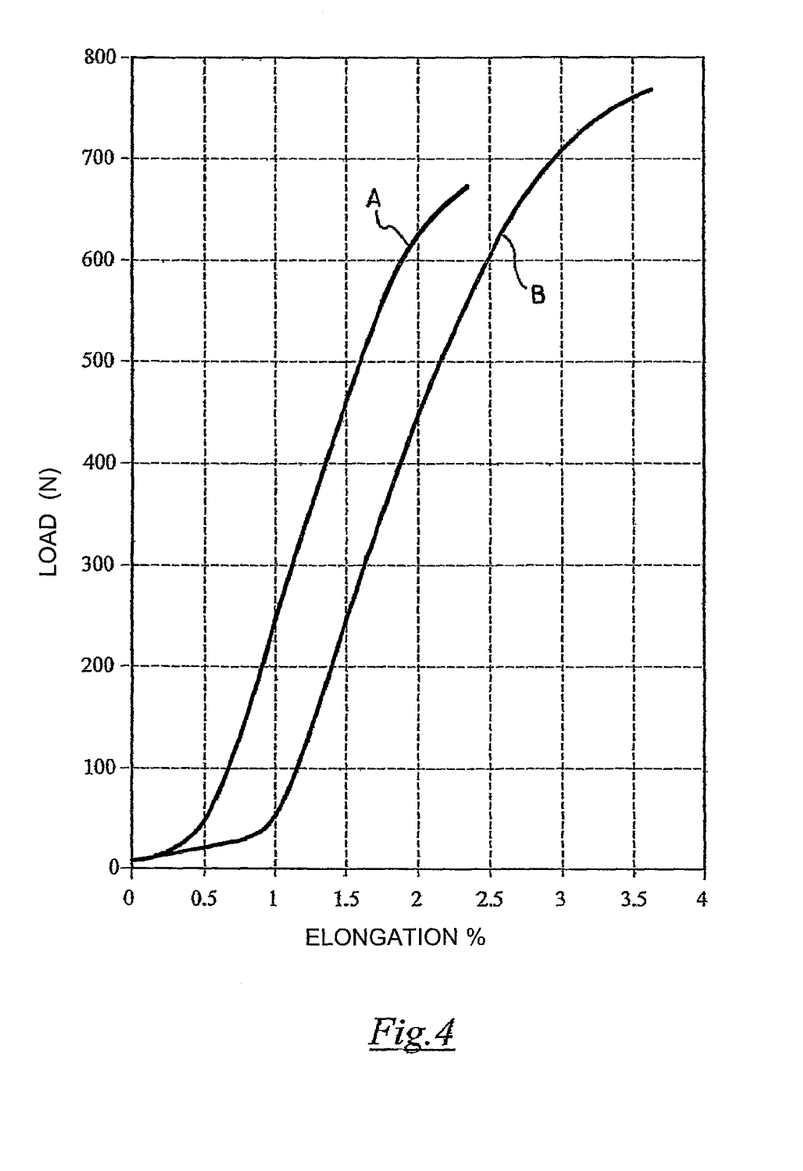
FIG. 4 is a load-elongation diagram of the reinforcing cord of FIG. 2 and of a reinforcing cord used in a known tyre manufactured by the Applicant.

Curve A of FIG. 4 shows the load-elongation diagram of a preferred embodiment of a cord 11 usable in the belt structure 10 of tyre 100 of the present invention. Hereinafter, such cord is referred to as cord A. In particular, it is a cord having a diameter of 0.75 mm and comprising eight NT steel wires.

Three of these eight steel wires are twisted together to form the above core of metal wires whereas the other five metal wires are twisted about said core without fully enclosing it, for example as shown in FIGS. 2 and 3. The twisting of all metal wires (both those defining the above core and those arranged about said core) is left-hand and has a single twisting pitch equal to about 10 mm. Cord A has a linear density of about 2 g/m. The test was carried out on a bare cord, i.e. not coated with rubber, and resulted in a breaking load of 670 N, an elongation at break equal to 2.35% and a stiffness equal to 27.6 (TSU, Taber Stiffness Unit). Such stiffness is determined by the BISFA E8 method (The International Bureau For The Standardization Of Man-Made Fibres, Internationally Agreed Methods For Testing Steel Tyre Cords; 1995 edition).

The Applicant has compared the load-elongation behaviour of cord A described above with that of a HE cord used in the belt structure of the zero degree type of a tyre currently manufactured and sold by the same Applicant and appreciated by customers for its excellent features of structural resistance, performance (in terms of adhesion, driving stability, controllability, directionality, road-holding) and comfort.

Curve B of FIG. 4 shows the load-elongation diagram of the above HE cord (in a non-rubber coated configuration as well). Hereinafter, such cord is referred to as cord B. This cord has a diameter of 0.95 mm and comprises nine HT steel wires divided into three strands. The three strands are twisted together, each strand in turn comprising three metal wires twisted together. The twisting pitch of the strands is equal to about 3 mm whereas the twisting pitch of the metal wires of each strand is equal to about 6 mm. The twisting of the above strands and of the above metal wires is left-hand. Cord B has a linear density of about 2.4 g/m, a stiffness (TSU, Taber Stiffness Unit) equal to 28.6 (determined by the above BISFA E8 method), a breaking load of 758 N and an elongation at break equal to 3.67%.

FIG. 4 shows that curve A, as well as curve B, comprises a curvilinear portion arranged between two substantially rectilinear portions having a different inclination with respect to the diagram axes. In particular, with reference to the abscissa axis, the substantially rectilinear portion on the left of the curvilinear portion has a smaller inclination than the substantially rectilinear portion on the right of the curvilinear portion.

From FIG. 4 it is possible to infer the different elongation at break and the different part load elongation of cords A and B discussed above.

Figure 5:
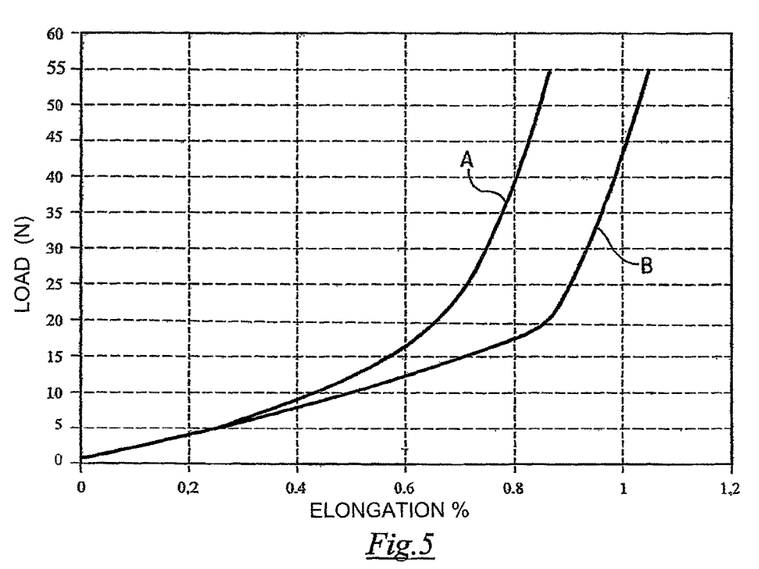
FIG. 5 is an enlargement of a portion of the diagram of FIG. 4 wherein the part load elongation of the two cords is shown.

The different part load behaviour is more clearly inferred from FIG. 5. In particular, it is noted that cord A has an elongation at break significantly smaller than that of cord B. For example, a load of 40 N produces an elongation of about 0.8% in cord A and an elongation substantially equal to 1% in cord B.

The Applicant has repeated the above comparative test on both reinforced strip-like elements comprising two or three cords A and B, respectively, and on the above reinforced strip-like elements when vulcanized and has noted that, while different values of the above parameters were measured due to the presence of pressure pre-loads and/or loads adapted to simulate the loads which the tyre is subjected to in the manufacturing and operating step, curves are obtained having a trend which substantially corresponds to the one discussed above. This confirms that the behaviour of cords A and B when used in the respective tyres is consistent with that described above and shown in FIGS. 4 and 5.

The Applicant has found that cord A has a weight 12% smaller than that of cord B and a diameter 23% smaller than that of cord B. According to the Applicant, such reduction of weight and diameter in cord A may be ascribed to the smaller number of wires compared to cord B (eight in cord A, nine in cord B). Advantageously, this implies a reduction of the weight of the tyre of the present invention and of the manufacturing time and/or cost of such tyre. The reduction of the diameter of cord A further allows a reduction of the rubber coating thicknesses, thus contributing to the above reduction of weight and/or manufacturing cost and/or time.

The Applicant has surprisingly found that while the part load elongation of cord A is smaller than that of cord B, nevertheless it is such as to allow the building of a green tyre having a smaller diameter than the vulcanized tyre, which makes the introduction of the green tyre into the vulcanization mould easier.

In fact, cords 11 of the type described above have conveniently been used by the Applicant for building a plurality of tyres 100 according to the present invention without incurring in any process problems.

In order to check the behaviour of tyre 100 of the present invention in terms of conformability, the Applicant has carried out a number of comparative impact resistance tests on tyres comprising a belt structure of the zero degree type including the cord A described above (thus corresponding to tyre 100 of the present invention) and on a known tyre comprising a belt structure of the zero degree type including the cord B described above (hereinafter tyre B' or "comparison").

In particular, the above tyres were subjected to repeated hits using a 150 Kg hammer which was dropped down from different heights. The Applicant has surprisingly found that as the number of hits and the energy level of each hit increase, tyre 100 of the present invention, while incorporating cords having a greater bending stiffness than the cords used in the comparison tyre, has a better impact resistance than the comparison tyre.

Figure 6:
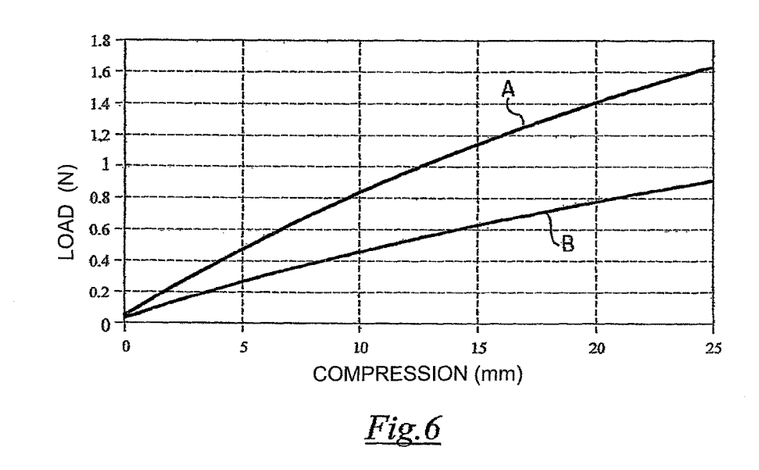
FIG. 6 is a load-compression diagram of the reinforcing cord of FIG. 2 and of the reinforcing cord used in the above known tyre.

The greater bending stiffness of cord A used in the belt structure of the zero degree type of the tyre of the present invention compared to cord B used in the belt structure of the zero degree type of the above known tyre can be inferred from FIG. 6 which shows the load/compression diagram of cord A and of the above cord B when such cords are incorporated into respective ring/shaped reinforced strip-like elements and after the vulcanization. It is actually noted that the reinforced strip-like element which incorporates cord A has a much greater stiffness than the reinforced strip-like element which incorporates cord B, with a deviation which among the other things increases as the load increases. For example, in order to obtain the same 20 mm compression it is necessary to apply a 1.4 N load on the strip-like element comprising cord A whereas a load of about 0.6 N is sufficient for the strip-like element comprising cord B.

In order to assess the behaviour of tyre 100 of the present invention in terms of performance (adhesion, driving stability, controllability, directionality, road-holding) and comfort, the Applicant has carried out a number of comparative on-road tests using a tyre 100 comprising a belt structure of the zero degree type including cord A described above (thus corresponding to tyre 100 of the present invention) and a known tyre comprising a belt structure of the zero degree type including cord B described above (hereinafter tyre B' or "comparison").

Tyres 100 and B' were mounted on the rear wheel of a Honda Hornet 600. On the contrary, known tyres with belt structures of the zero degree type comprising cords B were mounted on the front wheel.

The rear tyres has a size 180/55 R17 and therefore they only differed in the different type of cord used in the respective belt structures. The front tyre had a size 120/70 R17 and the same structure.

The tester gave a very good overall judgement regarding the behaviour of tyre 100 of the present invention.

A similar test was carried out by mounting a tyre 100 according to the present invention on a more performing motorcycle, in particular a Honda CB 1000 R. Also in this case, the tester gave an excellent judgement.

In particular, the judgements provided by the tester shown that tyre 100 of the present invention has an overall behaviour that, regarding the general performance, is comparable to that of the already excellent comparison tyre which was chosen.

More in particular, the tester verified that tyre 100 of the present invention responds in an optimal manner to the longitudinal and lateral stresses which are generated while running despite the use, in such tyre, of a belt structure of the zero degree type including a cord A whose elongation at high loads is smaller than that of the cord B used in the belt structure of the zero degree type of the comparison tyre.

The tester even found better results than those of the comparison tyre in terms of conformability and comfort (bump absorption and kick back absorption). According to the Applicant, this is quite important and surprising due to the fact that the reduced part load elongation of the cords used in the tyre of the present invention, anticipating the start of the behaviour at a higher traction stiffness of the cords to lower deformation/stress levels imposed by the tyre-road interaction and/or implying a greater bending stiffness of the cord and/or of the reinforced strip-like element, may reasonably have caused a greater stiffness and fragility of the tyre. On the contrary, a better result was unexpectedly obtained in terms of comfort and conformability of the tyres.

The Applicant believes that the surprising result in terms of comfort and conformability may be ascribed to the effective dampening and dissipation action carried out by the elastomeric material towards the longitudinal and lateral stresses the metal wires of the cord are subjected to while the motorcycle is running and during impacts. According to the Applicant, such dampening and dissipation action is possible because, after the vulcanization of the tyre of the present invention, the elastomeric material is distributed about each one of the metal wires of the cord.

The present invention has been described with reference to some preferred embodiments. Several changes may be made to the embodiments described above without departing from the scope of protection of the invention defined by the following claims.

The invention claimed is:

1. A motorcycle tyre, comprising:
   a carcass structure; and
   a belt structure of zero-degree type arranged in a radially outer position with respect to the carcass structure; and
   a tread band arranged in a radially outer position with respect to the belt structure,
   wherein said belt structure comprises at least one reinforcing cord wound on said carcass structure according to adjacent coils oriented along a direction forming an angle ranging from 0° to 5° with respect to the circumferential direction, and
   wherein said at least one reinforcing cord has an elongation at break smaller than 2.45% and comprises:
      a plurality of first metal wires twisted so as to form a core of first metal wires; and
      a plurality of second metal wires twisted together around said core of first metal wires,
      wherein the number and diameter of said second metal wires are such that said second metal wires are not able to fully enclose said core of first metal wires,
      wherein the tyre has a curvature ratio greater than or equal to 0.2; and
      wherein, in each cross section of said at least one reinforcing cord, the second metal wires are positioned at only an angular portion of an ideal circumference that circumscribes the core.

2. The tyre according to claim 1, wherein the sum of said plurality of first metal wires and said plurality of second metal wires ranges from five to ten metal wires.

3. The tyre according to claim 1, wherein the sum of said plurality of first metal wires and said plurality of second metal wires equals eight metal wires.

4. The tyre according to claim 1, wherein the number of said plurality of first metal wires twisted so as to form said core of first metal wires is two or three first metal wires.

5. The tyre according to claim 1, wherein the number of said plurality of second metal wires ranges from three to seven second metal wires.

6. The tyre according to claim 1, wherein the number of said plurality of second metal wires equals five second metal wires.

7. The tyre according to claim 1, wherein said first metal wires are twisted with a first twisting pitch ranging from 5 mm to 16 mm.

8. The tyre according to claim 7, wherein said second metal wires are twisted with a second twisting pitch ranging from 5 mm to 16 mm, and wherein said first twisting pitch is equal to said second twisting pitch.

9. The tyre according to claim 1, wherein said second metal wires are twisted with a second twisting pitch ranging from 5 mm to 16 mm.

10. The tyre according to claim 1, wherein said at least one reinforcing cord has a diameter ranging from 0.4 mm to 1.4 mm.

11. The tyre according to claim 1, wherein said first metal wires have a diameter ranging from 0.08 mm to 0.35 mm.

12. The tyre according to claim 1, wherein said second metal wires have a diameter ranging from 0.08 mm to 0.35 mm.

13. The tyre according to claim 1, wherein said first and second metal wires are made of the same material.

14. The tyre according to claim 1, wherein said first and second metal wires are made of steel.

* * * * *